Oct. 28, 1958 E. RIEDEL 2,858,025
DEVICE FOR DRAINING A MASS OF SLUDGE
Filed Feb. 15, 1955 2 Sheets-Sheet 1
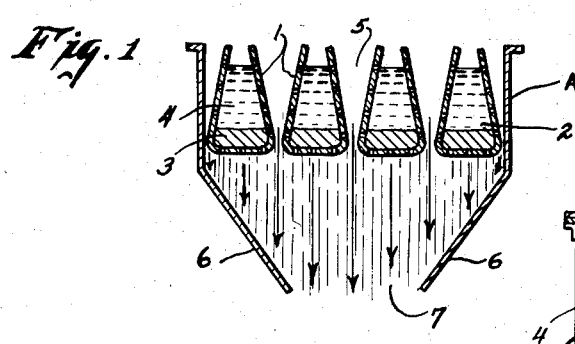
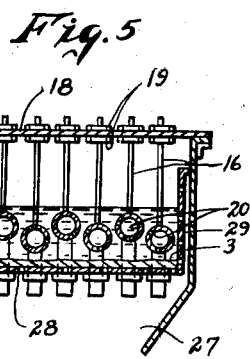
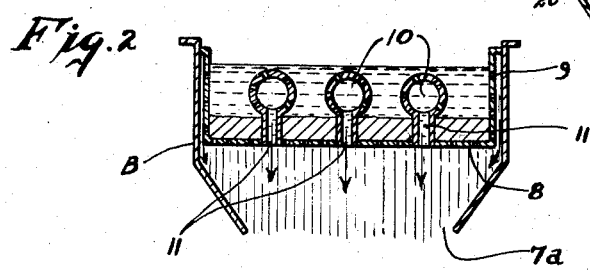
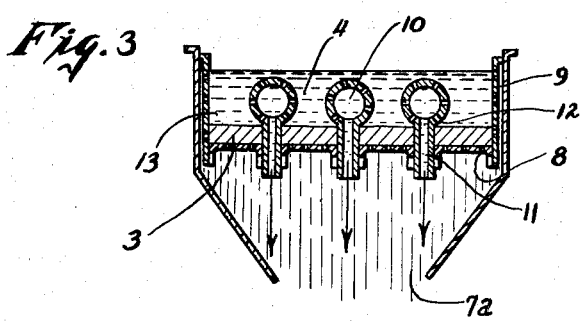
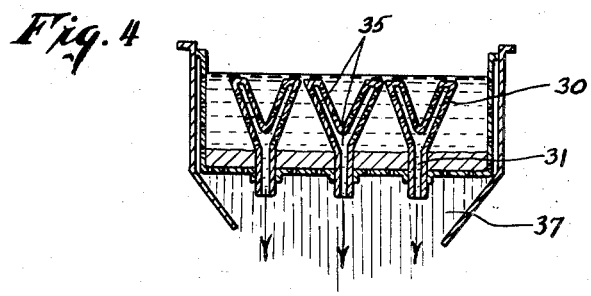
INVENTOR
ERICH RIEDEL
BY
*Mestern & Kollin*
ATTORNEYS

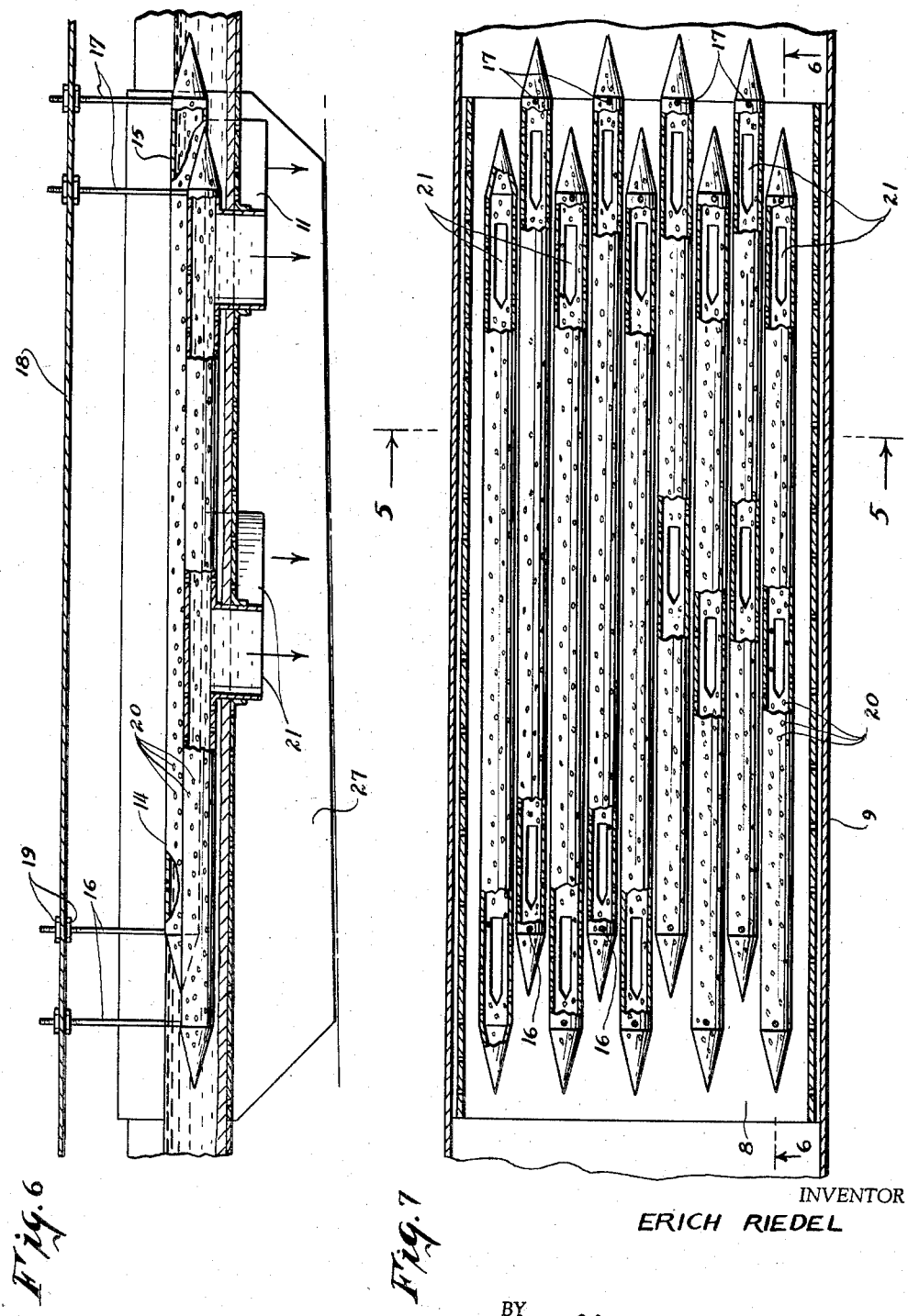

United States Patent Office 2,858,025
Patented Oct. 28, 1958

2,858,025

DEVICE FOR DRAINING A MASS OF SLUDGE

Erich Riedel, Gruiten, Kreis Mettmann, Germany, assignor to Brueckenbau Flender G. m. b. H., Duesseldorf, Germany Application February 15, 1955, Serial No. 488,361

1 Claim. (Cl. 210—295)

The present invention relates to a device for draining a mass of sludge or slurry. Such devices are used in drainage channels for the preliminary dehydration in wet processing and dressing systems, such as settling devices, in which mixtures of, for instance coal and water, are to be separated. Drainage channels are set up at a slight angle in longitudinal direction, in order to provide the necessary drop for the transportation of the slurry stream.

In the stream of sludge or slurry, which covers the bottom as well as the side walls of the channel, two clearly discernible separate zones are formed, a lower zone richer in solid components and an upper zone poorer in solids, the latter containing mainly water.

For effective separation of the solids from the liquids, it is important to drain as large a part of the liquid as possible from the channel. Several suggestions have been made for that purpose. At first, a sieve was simply arranged in the bottom of the channel with a water-drainage pit below. Such arrangement has the disadvantage that the solids contained in the slurry cover most of the sieve openings, whereby the drainage performance is considerably obstructed.

In order to improve this arrangement and to increase the available sieve surface, according to another suggestion, further sieves were built into the sidewalls of the channel, which were likewise connected to the water drainage device arranged below the bottom sieve. In this system, it is possible to drain at least part of the portions of water, poor in solids, from the upper zones of the channel and discharge them immediately therefrom.

However, in this arrangement too, the active sieve surface is comparatively small. A considerable improvement was only brought about by a so-called "chamber sieve drainage system" comprising a plurality of closely adjacent sieve walls arranged vertically at the bottom of the drainage channel, which vertical sieves enclose drainage chambers traversing the bed of the channel in longitudinal direction. Drainage results are much improved by this device because water was also drained directly from the center portions of the upper zones.

Finally, another suggestion was to provide displacement bodies in the upper part of the channel with the effect that the portions of the sludge or slurry poor in solids were pushed to the sidewalls and were thereby brought into better contact with the sieve surface there provided.

The present invention is based on the discovery that in a drainage system of this type, which is to operate with a high degree of water removal, not only is a large sieve area per unit of cross-section to be drained required, but that it is equally important to provide for a free transport movement of the solids carried along in the lower zones of the channel. In the known drainage systems described above there is the inconvenience that due to the sieve area density being equally distributed in the upper and lower channel portions, the lower portions effect a considerable braking action on the passing solids. The speed of transportation of the solids is thereby considerably decreased. Arranging the channels at the steeper angle is no possible measure of compensating for the braking action, because the differences in level between the ends of the channel are determined by auxiliary devices, such as settling tanks and drip pans arranged at both ends, which devices are mostly stationary.

Another reason why the arrangement of a channel at a steeper angle is undesirable is that such positioning incurs disturbances in the operation, particularly when the slurries are supplied irregularly.

The arrangement according to the invention is based on the concept that one factor of importance for increased effectiveness of the drainage system is a large sieve area for water removal in the upper channel portions, while another factor is that a wide bed at the bottom of the channel should be provided as unobstructed as possible by sieves, so that the solids will not be held back thereby. According to the invention, then, the sieve area in the upper portions of the channel is larger per unit of cross-section of the stream of slurry, where a smaller quantity of solids is transported, than in the lower channel portions, where more solids are moved. This general principle, on which the invention is based, may be realized in different ways. According to one embodiment of the invention, elongate sieve bodies are arranged in the upper channel portions, which bodies may have any desired profile, for instance, circular, oval, or forked. These bodies are connected by narrow vertical drainage ducts traversing the lower channel portions and the channel bottom.

In order to make the sieve bodies adjustable so as to correspond to the supply of slurry at any given time, means are provided for adjusting the height of the sieve bodies with respect to the channel bodies, so that these bodies may be made to lie further to the top or to the bottom of the slurry stream, as desired.

The uneven distribution of the effective sieve surfaces may also be brought about, according to the invention, by disposing in the channel bed closely adjacent longitudinal perforated rails of substantially U-shaped profile which have a tapering cross-section toward the top, whereby the main channel is subdivided into a number of single channels. In this way, too, a comparatively large drainage surface is made available for the slurry stream, poor in solids, passing along the upper channel zones, whereas the slurry stream, rich in solids, may travel comparatively unobstructed in the lower, much wider, zones of the channel.

Several embodiments of a drainage system according to the invention will now be described in further details with reference to the accompanying drawings, but it should be understood that this description is given by way of illustration and not of limitation and that many changes may be made in the particulars without departing from the spirit of the invention.

In the drawings:

Fig. 1 shows an embodiment of the drainage device in section;

Figs. 2 and 3 illustrate, likewise in section, other embodiments of the device;

Fig. 4 shows in section yet another embodiment, which is particularly effective in the upper portions of the trough; and Figs. 5, 6, and 7 show in transverse section, longitudinal section, and plan view with part in section, another embodiment of the device according to the invention.

Referring now to Fig. 1, a channel is designated by A, having inclined sidewalls at the bottom designated by 6. Longitudinally received in said channel is a plurality of substantially U-shaped rails 1 which have a markedly decreasing cross section toward the top. The bed of the channel is subdivided into a plurality of single channels 2, which have comparatively wide bottom portions moving a slurry 3, rich in solids, and comparatively narrow top portions with slurry 4, poor in solids. This results in an unequal distribution of the drainage sieve surface relatively to the cross-section of the slurry. The opposite side walls of each two of the longitudinal rails 1 form between them drainage chambers 5 which are connected to a common drainage vessel 7 formed by the inclined channel sidewalls 6. By this arrangement, the solids traveling at the comparatively wide bottom parts of the individual channels 2 are capable of relatively free movement and yet the water contained in the slurry in the upper zones meets a comparatively large drainage surface due to the inclined sidewalls capable of decreasing the cross-section of the turbid stream; the water can therefore easily escape into the drainage chamber 5.

Figs. 2 and 3 show very effective embodiments of the device. In these embodiments, bottom and lateral sieve surfaces 8 and 9 are provided in the drainage channel B. Into the channel, elongate drainage sieve bodies 10 of circular cross-section are inserted which are connected to the drainage vessel 7a by means of drainage ducts 11. These ducts 11 are of narrow cross-section and either merge into the bottom sieve 8 in vertical direction (as in Fig. 2) or traverse the same (as in Fig. 3). The ducts may either be provided with solid walls or with perforated walls.

Instead of having a circular profile, the bodies 10 may have an oval profile, and they are then preferably so arranged that the large axis of the oval tends to lie horizontally. In such an arrangement, the portions 4 of the slurry which are poor in solids, have a comparatively still larger drainage surface available as compared to the lower portion carrying the solids, so that very good conditions are afforded both for the drainage as for the transportation of the solids.

In order to make the drainage bodies 10 adjustable in height, in accordance with the supply of slurry, they have means for adjustment in common with the drainage ducts 11. It is thereby possible to adjust the bodies with their openings 12 (Fig. 3) into the ducts 11 at the border face 13, which is quite clearly discernible between the zone 3 rich in solids and the zone 4 poor in solids.

Figs. 5 to 7 show, among other features, one way of providing adjustment means for the height of the drainage body. The sieve bodies are designated by 20 and are held by rods 16 and 17. 14 and 15 are the ends of the sieve body 20, to which the rods 16 and 17 are attached. Above the channel, there is a supporting structure 18 for holding the supporting rods 16 and 17. Each rod 16 and 17, respectively, is provided with a pair of adjustment nuts 19 engaging with the supporting structure 18, and adjustment to height is, thereby, made possible.

In order to have a compact arrangement of the sieve bodies 20 in a narrow space, in the upper zones of the channel, they are in staggered arrangement both in height and length, as may be seen more particularly from Figs. 5 and 6.

A particularly high efficiency of the drainage bodies or sieves in the upper channel zones is accomplished in the embodiment shown in Fig. 4. Due to the fork-shaped profile of the drainage sieve body 30, the drainage body or sieve surfaces enclose drainage chambers 35 which are connected by narrow drainage ducts or channels 31 with the drainage container 37; the drainage ducts 31 are narrow and do not obstruct the flow in the lower zones of the channel to any noticeable extent. It can readily be seen that the total perforated surface is larger in the upper zones of the stream than in the lower zones.

The drainage ducts may either extend over the entire length of the sieve bodies or, as shown in Figs. 6 and 7, they may only extend over a short portion thereof. Since in the latter embodiment, the ducts 21 take up the least space in the lower zones of the channel bed and leave practically the entire width of the bed free for unobstructed transportation of the solids 3, without friction, this embodiment is particularly advantageous.

Finally, in order to make adaptable the drainage system according to the invention to the separation of grains of different sizes, the drainage sieves at different levels may have different mesh size. In conjunction with the adjustability of the sieve bodies in height, this provides for easy selective adjustment of separation corresponding to size of grain.

What I claim is:

A device for draining a mass of sludge which comprises a channel having a solid plate bottom, said channel being arranged at an angle to provide a longitudinal flow of a current of sludge, said current having zones comparatively poor in solids toward the top of the channel and zones comparatively rich in solids toward the bottom of said channel, a plurality of elongate, longitudinally arranged drainage bodies having a forked cross-section and extending through said plate bottom and having perforated surfaces, the total perforated surface calculated per unit of cross-section of the stream of sludge being larger in size in the upper zones of said stream, which are poorer in solids, than in the lower zones of the stream which are richer in solids, and a narrow drainage duct connected to the bottom of each drainage body for the discharge of liquid separated from said sludge.

References Cited in the file of this patent

UNITED STATES PATENTS

| 684,412 | Davidson | Oct. 15, 1901 |

FOREIGN PATENTS

| 238,845 | Switzerland | Nov. 16, 1945 |
| 693,595 | Great Britain | July 1, 1953 |